(12) United States Patent
Waag

(10) Patent No.: US 10,580,601 B2
(45) Date of Patent: Mar. 3, 2020

(54) DC OVERCURRENT PROTECTION APPARATUS

(71) Applicant: Bayerische Motoren Werke Aktiengesellschaft, Munich (DE)

(72) Inventor: Wladislaw Waag, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/131,815

(22) Filed: Sep. 14, 2018

(65) Prior Publication Data
US 2019/0013168 A1 Jan. 10, 2019

Related U.S. Application Data

(63) Continuation of application No. PCT/EP2017/055130, filed on Mar. 6, 2017.

(30) Foreign Application Priority Data

Mar. 16, 2016 (DE) ........................ 10 2016 204 287

(51) Int. Cl.
*H01H 39/00* (2006.01)
*H02H 1/00* (2006.01)
(Continued)

(52) U.S. Cl.
CPC ............... *H01H 39/00* (2013.01); *B60L 3/04* (2013.01); *H01H 89/00* (2013.01); *H01M 2/348* (2013.01);
(Continued)

(58) Field of Classification Search
CPC .. H01H 39/00; H01H 89/00; H01H 2039/008; H02H 1/0007; H02H 7/16;
(Continued)

(56) References Cited

U.S. PATENT DOCUMENTS 5,877,563 A * 3/1999 Krappel ............... H01H 39/006
180/271
9,472,942 B2 * 10/2016 Hotta .................... H02M 7/537

FOREIGN PATENT DOCUMENTS

DE 954178 C * 12/1956 ............ H01H 53/06
DE 101 32 750 A1 1/2003
(Continued)

OTHER PUBLICATIONS

Schwetzke German Patent Document DE 954178 Dec. 13, 1956 (Year: 1956).*
(Continued)

*Primary Examiner* — Kevin J Comber
(74) *Attorney, Agent, or Firm* — Crowell & Moring LLP

(57) ABSTRACT

A DC overcurrent protection apparatus includes an ignition current-controlled irreversible high-current switch-off element, an overcurrent detection unit which is electrically connected in a high-current path in series with the ignition current-controlled irreversible high-current switch-off element, and control contacts configured to control the ignition current-controlled irreversible high-current switch-off element. The control contacts are arranged such that they are electrically connectable to one another. The overcurrent detection unit is configured such that, when an overcurrent with a value equal to or greater than a predetermined current value flows in the high-current path, the control contacts, on account of an electromagnetic force generated by the overcurrent, are electrically connected to each other such that an ignition current is transmitted to the ignition current-controlled irreversible high-current switch-off element and the ignition current-controlled irreversible high-current switch-off element is switched by control to a switched-off state.

6 Claims, 6 Drawing Sheets

(51) Int. Cl.
*B60L 3/04* (2006.01)
*H01H 89/00* (2006.01)
*H01M 2/34* (2006.01)
*H02H 7/16* (2006.01)
*H02H 7/18* (2006.01)

(52) U.S. Cl.
CPC ............ *H02H 1/0007* (2013.01); *H02H 7/16* (2013.01); *H02H 7/18* (2013.01); *H01H 2039/008* (2013.01); *H01M 2200/103* (2013.01)

(58) Field of Classification Search
CPC .......... H02H 7/18; B60L 3/0069; B60L 3/04; B60R 16/03; H01M 2/348; H01M 2/34; H01M 2200/00; H01M 2/103
USPC ......................................................... 361/102
See application file for complete search history.

(56) References Cited

FOREIGN PATENT DOCUMENTS

| | | |
|---|---|---|
| DE | 10 2008 044 774 A1 | 10/2009 |
| DE | 10 2012 214 835 A1 | 2/2014 |
| DE | 10 2012 215 074 A1 | 2/2014 |

OTHER PUBLICATIONS

PCT/EP2017/055130, International Search Report dated May 22, 2017 (Three (3) pages).

\* cited by examiner

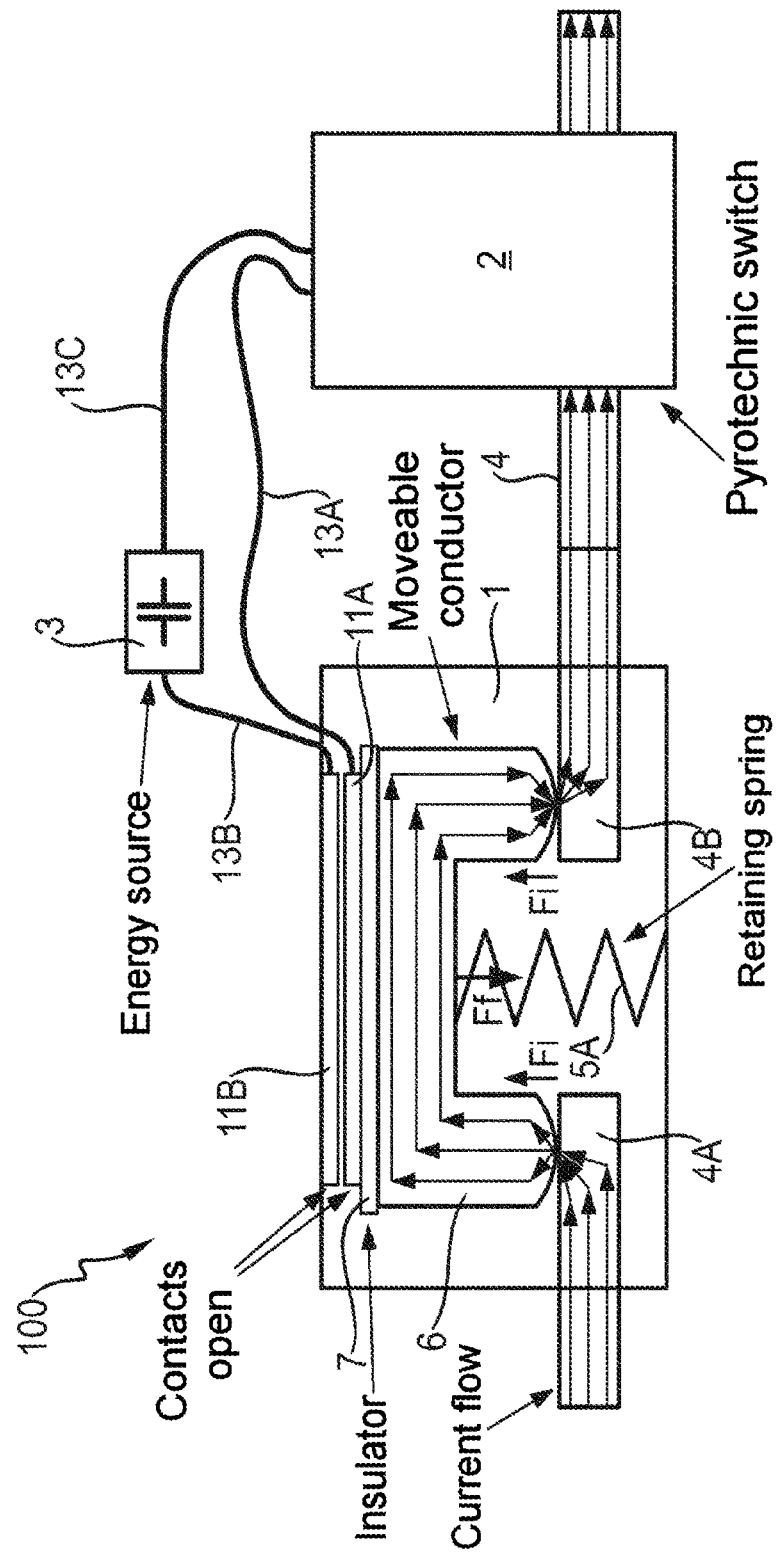

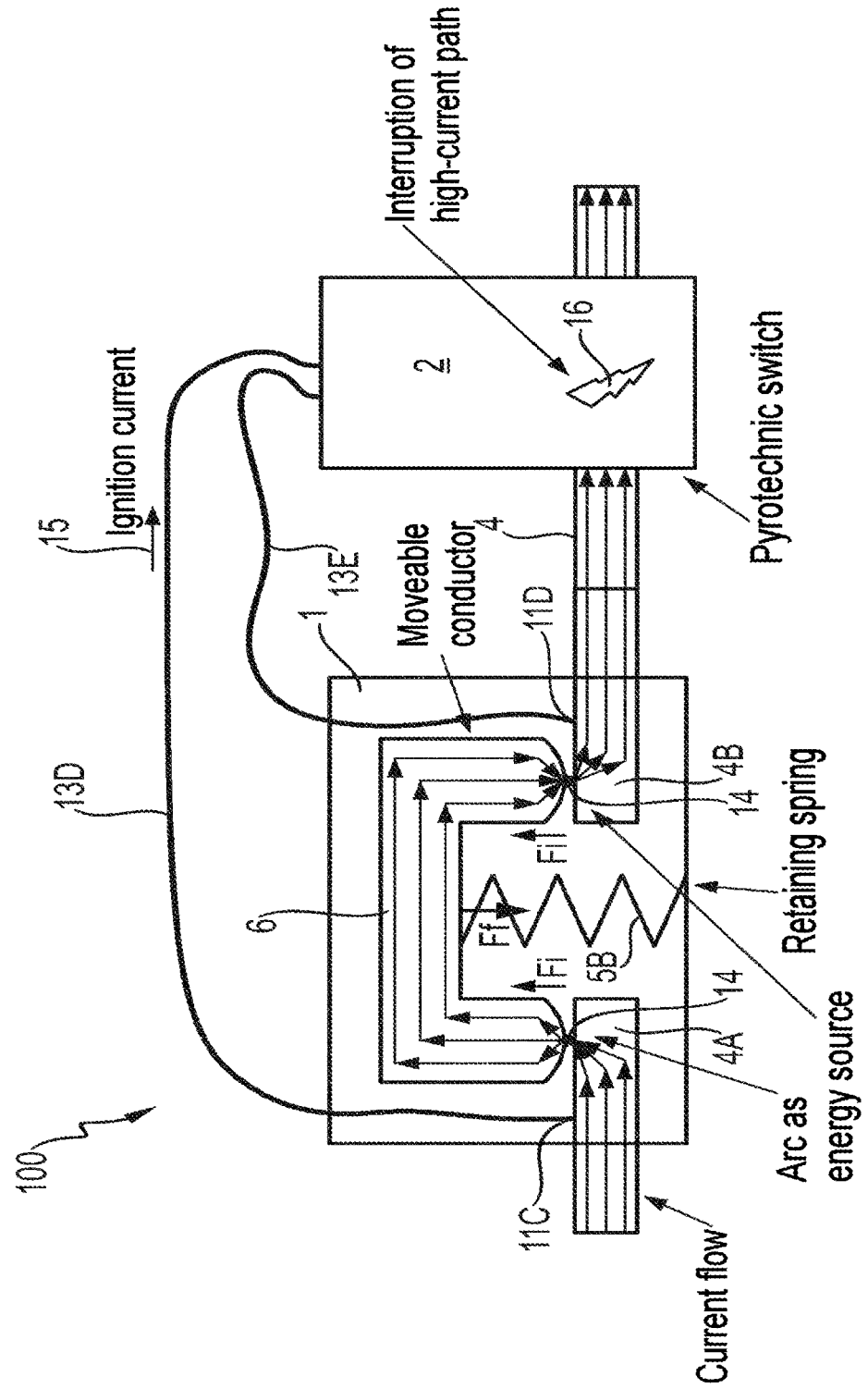

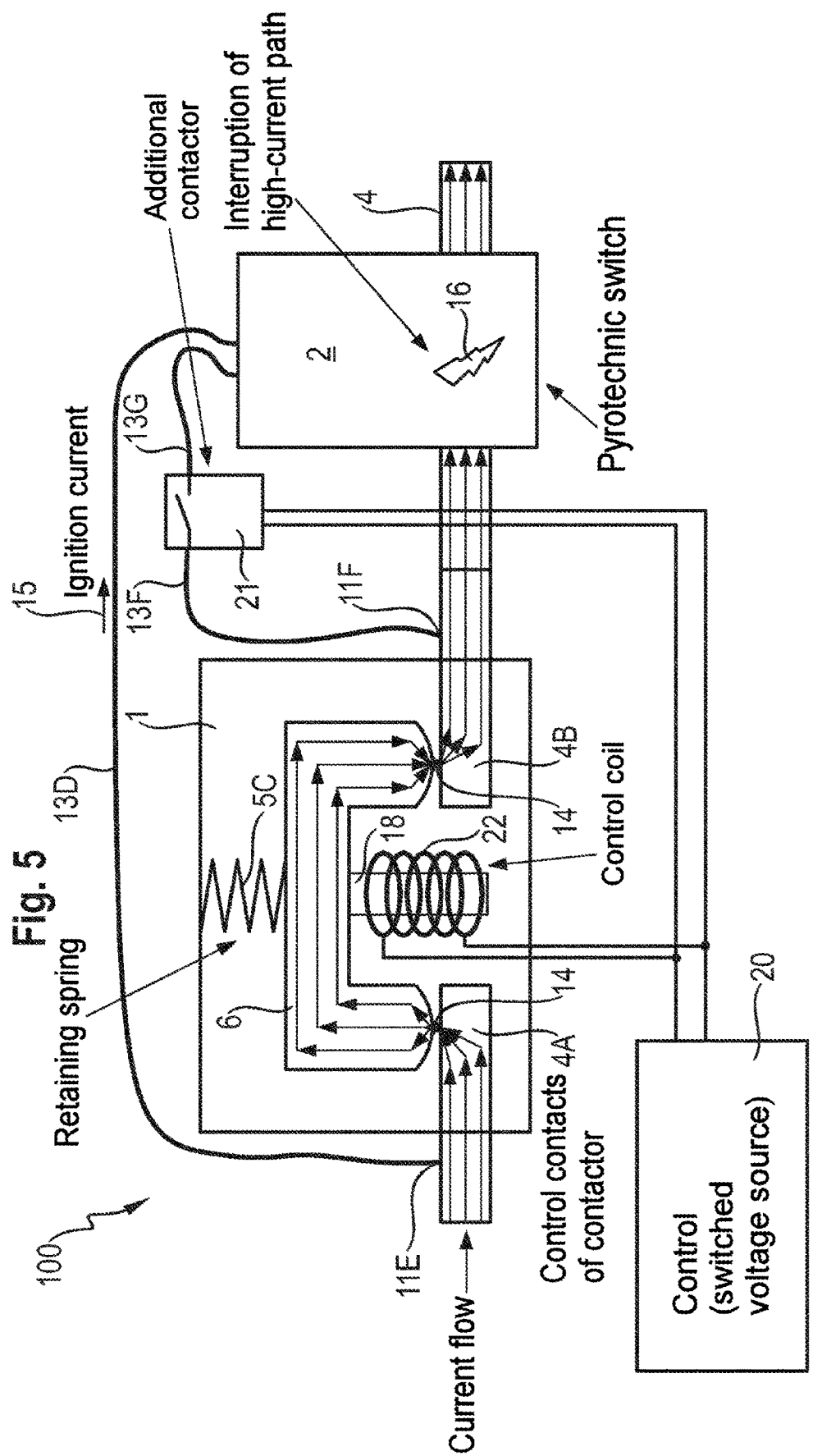

DC OVERCURRENT PROTECTION APPARATUS

CROSS REFERENCE TO RELATED APPLICATIONS

This application is a continuation of PCT International Application No. PCT/EP2017/055130, filed Mar. 6, 2017, which claims priority under 35 U.S.C. § 119 from German Patent Application No. 10 2016 204 287.4, filed Mar. 16, 2016, the entire disclosures of which are herein expressly incorporated by reference.

BACKGROUND AND SUMMARY OF THE INVENTION

The invention relates to a DC overcurrent protection apparatus, which comprises an ignition current-controlled irreversible high-current switch-off element, an overcurrent detection unit and control contacts for controlling the ignition current-controlled irreversible high-current switch-off element.

Many applications exist in which a direct current, also described as a DC current, must be restricted to a maximum value, in order to protect components against an overcurrent in the event of an overload or a short-circuit. One example is the high-voltage on-board network of an electric or hybrid vehicle. In this example, two contactors and a fuse are customarily incorporated in a high-voltage battery. The contactors isolate the high-voltage battery from other components in the vehicle in normal duty, and in the event of smaller overload currents. The fuse assumes the isolating function in the event of high overload and short-circuit currents. A conventional fuse has a disadvantage, in that it operates by the thermal principle, and thus requires a long current-dependent time interval for the interruption of the current flow. Accordingly, in the event of not too high currents, it may not be sufficiently rapid to protect the vehicle components against an overload.

In consequence, concepts already exist in which a pyrotechnic switch-off element is employed, in addition to conventional switching elements (contactors, fuses). An ignition element (also described as a detonator) of the pyrotechnic switch-off element is tripped by means of a current signal, and executes the interruption of the high-current path. The ignition signal is generated by an electronic control circuit, which measures the high current to be monitored and generates the ignition signal immediately the current in the high-voltage network exceeds a maximum permissible value.

This type of actuation of the pyrotechnic switch-off element has the following disadvantages: the current measurement circuit can be disturbed, and this disturbance can result in spurious tripping or, conversely, in non-tripping in response to an overcurrent. The current measurement circuit incorporating ignition electronics can be of a complex design, with a high failure rate. For its operation, the current measurement circuit requires energy at all times, and thus increases current consumption, if it is not completely deactivated.

The object of the present invention is the alleviation or elimination of the above-mentioned disadvantages of the prior art. Specifically, a DC overcurrent protection apparatus is disclosed which, for the prevention of spurious tripping, is insensitive to disturbances, specifically electromagnetic disturbances, is not associated with continuous current consumption, has a low failure rate, and responds rapidly to an overcurrent.

According to the invention, the above-mentioned object is fulfilled by the characteristics of the independent claim. Advantageous embodiments are the subject matter of sub-claims.

The DC overcurrent protection apparatus according to the invention comprises an ignition current-controlled irreversible high-current switch-off element, an overcurrent detection unit which is electrically connected in a high-current path in series with the ignition current-controlled irreversible high-current switch-off element, and control contacts for controlling the ignition current-controlled irreversible high-current switch-off element, which are arranged such that they can be electrically connected to one another. The overcurrent detection unit is designed such that, when an overcurrent with a value equal to or greater than a predetermined current value flows in the high-current path, the control contacts, on account of an electromagnetic force which is generated by the overcurrent, are electrically connected to each other in such a way that an ignition current is transmitted to the ignition current-controlled irreversible high-current switch-off element, so that the ignition current-controlled irreversible high-current switch-off element is switched by control to a switched-off state.

In one form of embodiment of the invention, the ignition current-controlled irreversible high-current switch-off element is a pyrotechnic switch-off element. Hereinafter, a normal current is understood as a current having a value in the range of approximately 1,000 amperes (abbreviated hereinafter to "A") to approximately 1,500 A. Currents equal to or greater than approximately 1,500 A and smaller than approximately 3,000 A can be reversibly switched by means of a contactor. The high-current path is understood as an electrical path which conducts high currents equal to or greater than approximately 1,500 A up to a value of less than approximately 3,000 A. In one form of embodiment, currents of this type can be present in a high-voltage on-board network, which carries voltages between approximately 400 V and approximately 800 V, in a vehicle, specifically an electric, hybrid or fuel cell vehicle. Beyond approximately 3,000 A, an overcurrent may be present such that, in one form of embodiment, the predefined current value in the high-current path is approximately 3,000 A, and specifically is 3,000 A.

The electromagnetic force generated by the overcurrent can be, for example, a Lorentz force. The electromagnetic force is also understood as the force which, upon the flow of an electric current in any contact arrangement in the high-current path, is such that at least partially opposing and mutually touching high-current contact elements in said contact arrangement are mutually repulsed by the flow of current. This repulsive force occurs if the current in one of the two contact elements flows in one direction, transversely to a contact surface of said contact element and, in the other of the two contact elements, flows in another direction, transversely to a contact surface of the other contact element. The partially or totally mutually opposing, but at least directionally differing partial currents of the current flowing in the contact arrangement generate a repulsive force on the contact surfaces of the high-current contact elements of said contact arrangement. This effect in DC contacts is also described as electromagnetic levitation.

The apparatus according to the invention is insensitive to disturbances, specifically to electromagnetic disturbances which can impair a current measurement, but do not have sufficient energy to generate an electromagnetic force of sufficient magnitude and duration to cause the mutual electrical bonding of the control contacts. Spurious tripping of the irreversible high-current switch-off element by electromagnetic disturbances of this type is prevented accordingly.

In response to an electromagnetic force generated by the overcurrent, the control contacts which, at a high current which lies below the overcurrent value, are mutually separated, i.e. open, are mutually bonded, i.e. short-circuited, or are connected to an energy source for the generation of the ignition current, in order to transmit the ignition current to the ignition current-controlled irreversible high-current switch-off element. Accordingly, the electrical energy required to initiate the transmission of the ignition current is only tapped from the high-current path if an overcurrent is present. The apparatus according to the invention thus features no continuous current consumption. Forms of embodiment, described with reference to the figures hereinafter, for the generation of the electromagnetic force, associated with the overcurrent, for the mutual electrical connection of the control contacts can be realized without the use of electronic components, such that the failure rate of the apparatus is very low, and is reduced in comparison with conventional apparatuses. As a result of the simple design of the apparatus according to the invention, which employs the overcurrent for the transmission of the ignition current to the irreversible high-current switch-off element, the apparatus responds very rapidly, and more rapidly than conventional apparatuses.

In one form of embodiment of the invention, the overcurrent detection unit incorporates a retaining element, which is arranged between a wall section of the overcurrent detection unit and a permanent magnet which is moveable in relation to said wall section and held in the direction of the wall section by a retaining force of the retaining element, and to which a first control contact is attached. The high-current path is configured as a winding around the permanent magnet, and the overcurrent detection unit is configured such that, if the overcurrent flows in the high-current path, the permanent magnet moves against the retaining force of the retaining element, such that the first control contact engages with a second stationary control contact, which is arranged opposite said wall section. As a result, the first control contact is short-circuited with the second control contact, such that an energy source which is connected to the second control contact transmits the ignition current to the ignition current-controlled irreversible high-current switch-off element.

The arrangement for the short-circuiting of the control contacts is of simple conception, and comprises only a high-current path winding, the permanent magnet and a retaining element. Consequently, this DC overcurrent protection apparatus according to the invention is exceptionally fail-safe and reliable, and trips rapidly in the event of an overcurrent. Energy is only tapped from the high-current path in the event of an overcurrent, as a result of which the apparatus consumes little current. In this form of embodiment, the overcurrent detection unit is completely reversible, i.e. it can be reused, with no modification, further to the occurrence of an overcurrent, and is therefore reliable and of a low-maintenance design.

Only the spontaneous discharging of the energy source for the generation of the ignition current will require compensation on an occasional basis. A capacitor, a double-layer capacitor, a battery, a high-voltage battery supplying the on-board network which is to be protected against an overcurrent itself, or similar, can be employed as an energy source. Where applicable, a charging circuit can be implemented which recharges the energy source periodically, or in the event of a decline to a minimum energy value which is required for the maintenance of the operation of the energy source, in order to offset spontaneous discharging.

In this form of embodiment, the control contacts are incorporated in the overcurrent detection unit. However, forms of embodiment are also conceivable in which the permanent magnet is brought out of a housing of the overcurrent detection unit, and the first and/or second control contact are/is arranged outside the overcurrent detection unit.

The winding can be configured such that the high-current path incorporates an inductance, which comprises at least one loop.

In a further form of embodiment of the invention, the overcurrent detection unit incorporates a retaining element, which is arranged between a wall section of the overcurrent detection unit and a high-current-conducting bracket, which is moveable in relation to said wall section, to which a first control contact is attached. The bracket is held in the direction of the wall section by a retaining force of the retaining element, such that a flow of current in the high-current path is routed through the bracket, and the bracket constitutes an element of the high-current path. The overcurrent detection unit is configured such that, if the overcurrent flows in the high-current path, the bracket moves against the retaining force of the retaining element, such that the first control contact engages with a second stationary control contact, which is arranged opposite said wall section, as a result of which the first control contact is short-circuited with the second control contact. By means of this short-circuit, an energy source which is connected to the second control contact transmits the ignition current to the ignition current-controlled irreversible high-current switch-off element.

The first control contact can be separated from the bracket by an insulating element in the form of an insulating layer. The insulating element can be formed of plastic, or of another non-conductive material. The first control contact can be fitted to one side of the bracket, which is arranged opposite a side of the bracket to which the retaining element is attached.

As the bracket constitutes an element of the high-current path, the design of the short-circuiting arrangement for the control contacts can be even simpler than in the preceding forms of embodiment, and require only the incorporation of two contact points in the high-current path for the constitution of the bracket, and the fitting of a retaining element to the bracket. In this form of embodiment, the control contacts are incorporated in the overcurrent detection unit. In other forms of embodiment, the first and/or the second control contact can be arranged outside the overcurrent detection unit.

In a particular form of embodiment of the invention, the overcurrent detection unit incorporates a retaining element, which is arranged between a wall section of the overcurrent detection unit and a high-current-conducting bracket, which is moveable in relation to said wall section. The bracket is retained by a retaining force of the retaining element in the direction of the wall section, such that a current flow in the high-current path is routed through the bracket, and the bracket constitutes an element of the high-current path. In one direction of the current flow in the high-current path, a first control contact, up-circuit of the element of the high-current path constituted by the bracket, and a second control contact, down-circuit of the element of the high-current path constituted by the bracket, are respectively connected to the high-current path. The overcurrent detection unit is configured such that, if the overcurrent flows in the high-current path, the bracket, against the retaining force of the retaining element, moves away from the element of the high-current path which is not constituted by the bracket such that, on at least one high-current contact point between the bracket and the element of the high-current path which is not constituted by the bracket, an arc is generated, the resistance of which results in a voltage drop across the first and second control contacts. In response to the voltage and the resistance, the ignition current is transmitted to the ignition current-controlled irreversible high-current switch-off element.

In this form of embodiment, the arc which is generated when the bracket, in the event of an overcurrent, is separated from that element of the high-current path which is not constituted by the bracket, is employed as an energy source for the generation of the ignition current. An arc can occur at either end of the bracket. Alternatively, one end of the bracket can be rotatable, and connected to that element of the high-current path which is not constituted by the bracket in an electrically conductive manner. Conversely to the forms of embodiment described above, the control contacts are therefore not short-circuited, but are electrically interconnected via a resistance, which is constituted by the arc. The control contacts which are connected to that element of the high-current path which is not constituted by the bracket can be arranged such that the bracket is connected in-circuit between the control contacts. Accordingly, an arrangement of the control contacts, or of one of the two control contacts, either within or outside the overcurrent detection unit is possible.

In the forms of embodiment of the invention with the bracket described, the retaining element can be configured as a solid retainer, which fails if the electromagnetic force generated by the overcurrent exceeds a predefined value. The retaining element can thus be constituted in a simple and cost-effective manner.

In a further form of embodiment of the DC overcurrent protection apparatus according to the invention, the overcurrent detection unit incorporates a retaining element, which is arranged between a wall section of the overcurrent detection unit and a high-current-conducting bracket, which is moveable in relation to said wall section. The bracket is retained by a retaining force of the retaining element in the direction of the wall section, and a permanent magnet is attached to the bracket and is carried in a winding such that, if no control voltage from a voltage source is present on the winding, a flow of current in the high-current path through the bracket is prevented, and the bracket does not constitute an element of the high-current path. If the control voltage from the voltage source is present on the winding, and a current which is smaller than the predefined current is flowing in the high-current path, the bracket moves against the retaining force of the retaining element, such that the flow of current in the high-current path is routed through the bracket, and the bracket constitutes an element of the high-current path. In one direction of the current flow in the high-current path, a first control contact, up-circuit of the element of the high-current path constituted by the bracket, and a second control contact, down-circuit of the element of the high-current path constituted by the bracket, are respectively connected to the high-current path. Between at least one of the first and second control contacts and the ignition current-controlled irreversible high-current switch-off element, a contactor, which is connected to the voltage source, is connected in-circuit such that, if no control voltage from the voltage source is present on the winding and on the contactor, and the bracket does not constitute an element of the high-current path, a no-load voltage which is present across the first and second control contacts does not result in the transmission of the ignition current to the ignition current-controlled irreversible high-current switch-off element. The overcurrent detection unit is configured such that, if the overcurrent flows in the high-current path, the bracket, notwithstanding the control voltage from the voltage source which is present on the winding and on the contactor, moves away from that element of the high-current path which is not constituted by the bracket, in the direction of the retaining force of the retaining element, such that, on at least one high-current contact point between the bracket and the element of the high-current path which is not constituted by the bracket, an arc is generated. The arc has a resistance, which results in a voltage drop across the first and second control contacts. In response to the voltage and the resistance, the ignition current is transmitted to the ignition current-controlled irreversible high-current switch-off element.

In this form of embodiment, the overcurrent detection unit constitutes a high-voltage contactor, wherein, by means of the contactor, it is prevented that any no-load voltage which is present across the bracket when the high-voltage contactor is open results in the transmission of the ignition current to the irreversible high-current switch-off element. Consequently, this switch-off element is only tripped if the high-voltage contactor is closed to permit a flow of current in the high-current path, and an overcurrent occurs such that an arc is generated between the bracket and the element of the high-current path which is not constituted by the bracket which is sufficient to trip the interruption by the irreversible high-current switch-off element of the current flow in the high-current path. At currents below the overcurrent, or in the event of a residual current flow, the overcurrent detection unit can reversibly interrupt or close the high-current path.

Advantageously, in all the DC overcurrent protection apparatuses according to the invention described above, the retaining element can be configured as a spring.

The DC overcurrent protection apparatus according to the invention, in an advantageous form of embodiment, can be incorporated in a housing and/or in the form of a subassembly.

The DC overcurrent protection apparatus according to the invention can additionally be incorporated in a high-voltage on-board network of a vehicle, preferably of an electric or hybrid vehicle.

Exemplary embodiments of the invention are described in greater detail hereinafter with reference to figures. In the interests of clarity, any true-to-scale or proportionally accurate representation has been omitted from the figures. In the figures, unless indicated otherwise, the same reference symbols identify identical components, having the same significance.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3A shows the layout of the DC overcurrent protection apparatus according to the invention, having an irreversible overcurrent detection unit for a normal high current, in a third form of embodiment, according to the schematic arrangement represented in FIG. 1.

FIG. 4 shows the layout of the DC overcurrent protection apparatus according to the invention, with a bracket connected in-circuit between the control contacts, in the event of an overcurrent, in a fourth form of embodiment.

FIG. 5 shows the layout of the DC overcurrent protection apparatus according to the invention, with the bracket connected in-circuit between the control contacts and, below the overcurrent, a reversibly-isolating overcurrent detection unit, in the event of an overcurrent, in a fifth form of embodiment.

DETAILED DESCRIPTION OF THE DRAWINGS

Figure 1:
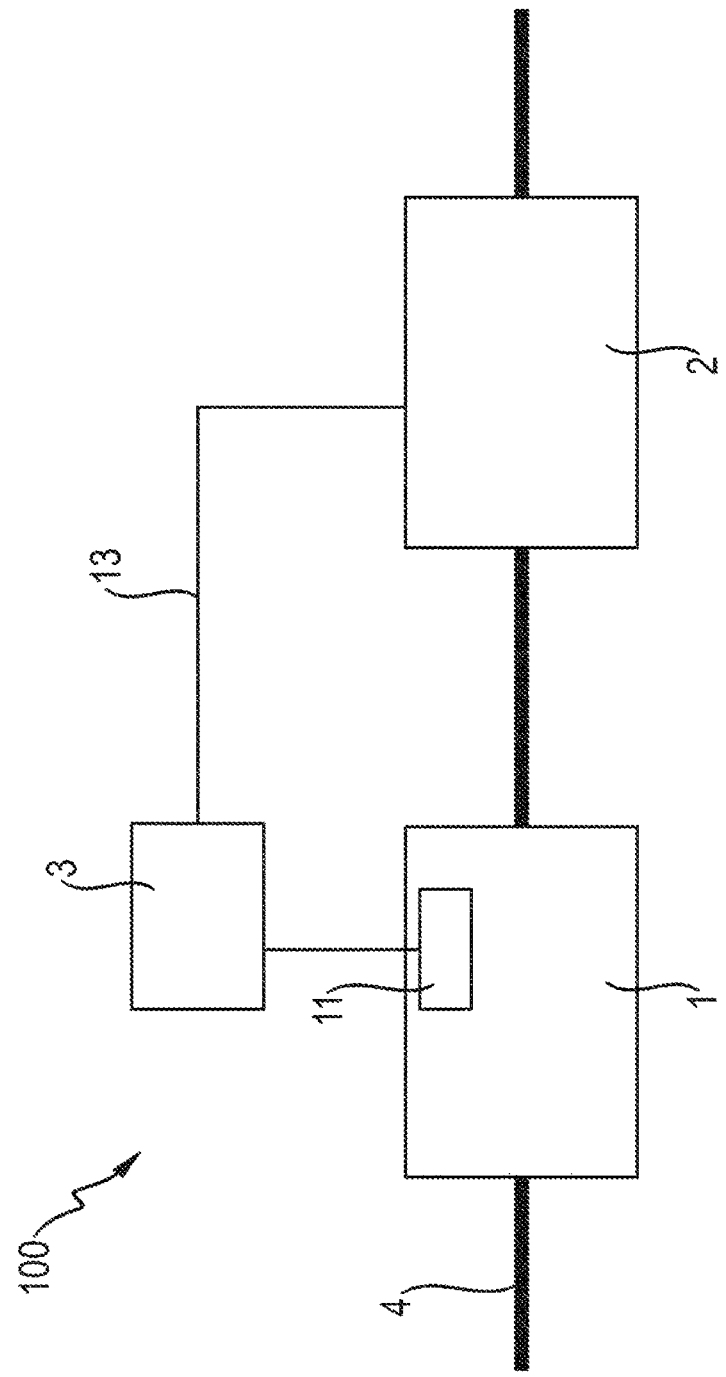
FIG. 1 shows a schematic arrangement of a DC overcurrent protection apparatus according to the invention, in a first form of embodiment, having an ignition current-controlled irreversible high-current switch-off element, an overcurrent detection unit which is connected in series with said switch-off element, control contacts which are incorporated in the overcurrent detection unit, and an energy source which is connected in-circuit between the control contacts and the switch-off element.

FIG. 1 shows a schematic arrangement of the DC overcurrent protection apparatus 100 according to the invention, with an ignition current-controlled irreversible high-current switch-off element 2, which is electrically connected in series to an overcurrent detection unit 1 in a high-current path 4. The ignition current-controlled irreversible high-current switch-off element 2 is configured as a pyrotechnic switch-off element, and is electrically connected to a first ignition current transmission line 13. An energy source 3, for example a capacitor, a double-layer capacitor, a battery, or a high-voltage battery of a high-voltage on-board network which is to be protected against an overcurrent, is connected via the ignition current transmission line 13 to the pyrotechnic switch-off element. By the short-circuiting of control contacts 11, which are incorporated in the overcurrent detection unit 1, upon the occurrence of an overcurrent in the high-current path 4, the energy source 3 can be connected to the pyrotechnic switch-off element 2, such that an ignition current is transmitted from the energy source 3 to the pyrotechnic switch-off element, in order to switch the pyrotechnic switch-off element 2 to a switched-off state. Immediately the switched-off state is achieved, a flow of current in the high-current path 4 is prevented by the pyrotechnic switch-off element 2.

The switching of the pyrotechnic switch-off element 2 to the switched-off state is irreversible such that, after the switch-off thereof, the pyrotechnic switch-off element 2 must be replaced in order to permit the further operation of the DC overcurrent protection apparatus. The function of the DC overcurrent protection apparatus is to permit the conduction of a normal high current, between approximately 1,500 A and a value of less than approximately 3,000 A, in the high-current path 4 and, in the event of an overcurrent of approximately 3,000 A or greater, to prevent a flow of current in the high-current path 4. The overcurrent detection unit 1 according to the invention is configured such that, if an overcurrent flows in the high-current path 4, the control contacts 11, as a result of an electromagnetic force generated by the overcurrent, are short-circuited such that an ignition current is transmitted from the energy source 3 to the ignition current-controlled irreversible high-current switch-off element 2, thereby switching said switch-off element 2 to the switched-off state.

Figure 2:
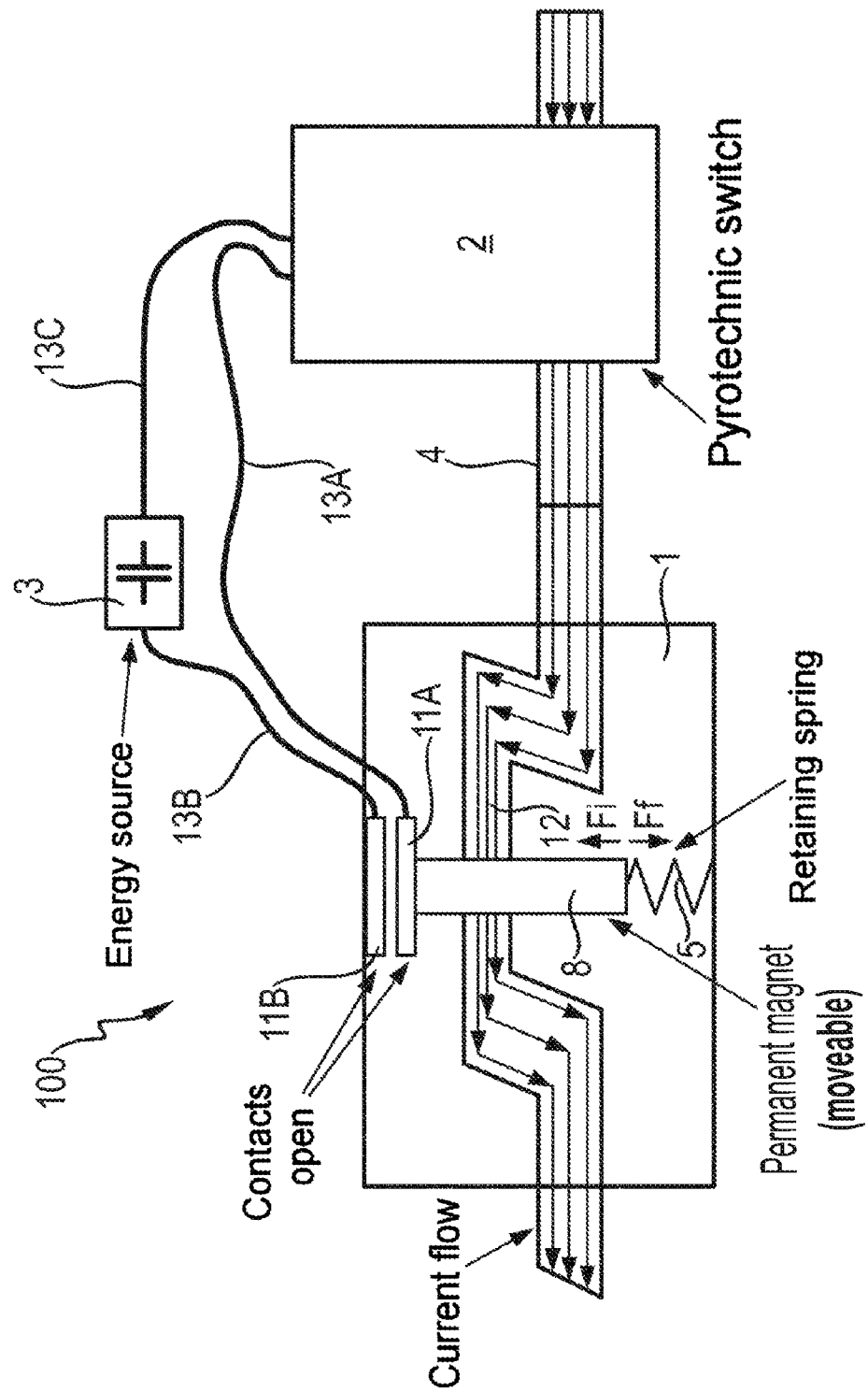
FIG. 2 shows the layout of the DC overcurrent protection apparatus according to the invention, in a second form of embodiment, having a reversible overcurrent detection unit according to the schematic arrangement represented in FIG. 1.

FIG. 2 shows the layout of the DC overcurrent protection apparatus 100 according to the invention in a further form of embodiment, with a fully-reversible overcurrent detection unit 1 which, further to the occurrence of the overcurrent in the high-current path 4, can be re-used with no modification. The overcurrent detection unit 1 comprises a winding in the form of an inductance which, in the simplest case, as represented in FIG. 2, is configured as a conductor loop 12 in the high-current path 4. The conductor loop 12 is routed around a permanent magnet 8 which, at one end, by means of a retaining element 5 in the form of a retaining spring, is connected to a wall section of a housing of the overcurrent detection unit 1. The permanent magnet 8 is retained by means of a retaining force of the retaining element 5 in the direction of the wall section (see arrow Ff in FIG. 2) and, at another end, which lies opposite the first end, incorporates a first control contact 11A which, in the event of a normal high current below the overcurrent in the high-current path 4, is arranged opposite a stationary second control contact 11B on the wall section, and is electrically connected to the pyrotechnic switch-off element 2 by means of a first control conductor 13A.

A magnetic field generated by the conductor loop 12 in the event of a flow of current in the high-current path 4 acts on the permanent magnet 8, and can result in the movement of the permanent magnet 8. Immediately a current in the high-current path 4 achieves or exceeds the overcurrent value, i.e. becomes an overcurrent rather than a normal high current, an overcurrent is present, resulting in the generation by the conductor loop 12 of a magnetic field which is sufficiently strong to move the permanent magnet 8 against the retaining force of the retaining element 5 (see arrow Fi in FIG. 2), such that the moveable first control contact 11A engages with the second stationary control contact 11B, thereby resulting in the short-circuiting of the first and second control contacts 11A, 11B. As a result of the short-circuit on the first and second control contacts 11A, 11B, the energy source 3, which is connected by means of a second control conductor 13B to the second contact 11B, is bonded to the pyrotechnic switch-off element 2 via a second ignition current transmission line 13C, such that an ignition current is transmitted to the pyrotechnic switch-off element 2 for the switch-off of said pyrotechnic switch-off element 2, thereby resulting in the interruption of a flow of current in the high-current path 4.

FIG. 3A shows the layout of the DC overcurrent protection apparatus 100 according to the invention, with an irreversible overcurrent detection unit 1, at a normal high current below the overcurrent, in a further form of embodiment according to the schematic arrangement represented in FIG. 1. The overcurrent detection unit 1 incorporates a retaining element 5A, which is arranged between a wall section of a housing of the overcurrent detection unit 1 and a high-current-conducting bracket 6, arranged opposite the wall section in a moveable manner, to which the first control contact 11A is attached. The first control contact 11A is separated from the bracket 6 in an electrically-insulated manner by an insulating layer 7. The bracket 6 is retained by a retaining force of the retaining element 5A in the direction of the wall section (see arrow Ff in FIG. 3A), such that a current flow in the high-current path 4, in the event of a normal high current below the overcurrent, is routed through the bracket 6, such that the bracket 6 constitutes an element of the high-current path 4.

Ends of the bracket 6 constitute high-current contacts with sections 4A, 4B of the element of the high-current path 4 which is not constituted by the bracket 6. The bracket 6 is compressed against the high-current contacts by the retaining element 5A, in the form of a retaining spring, such that, in the event of a current, the value of which is lower than the overcurrent value, in the high-current path 4, this current is routed through the bracket 6 as an element of the high-current path 4. In accordance with the DC overcurrent protection apparatus represented in FIG. 2, in the DC overcurrent protection apparatus according to FIG. 3A, the first control contact 11A, at a normal high current in the high-current path 4, is also arranged with a clearance to a second control contact 11B, in a stationary manner with respect to the wall section, such that the first control contact 11A is electrically connected to the pyrotechnic switch-off element 2 by means of a first control conductor 13A. The energy source 3, which is connected to the second contact 11B via a second control conductor 13B, is connected to the pyrotechnic switch-off element 2 via the second ignition current transmission line 13C. In the presence of a current, an electromagnetic force is generated on each high-current contact in the high-current path 4, which endeavors to separate the high-current contacts (see arrow Fi in FIG. 3A).

Figure 3B:
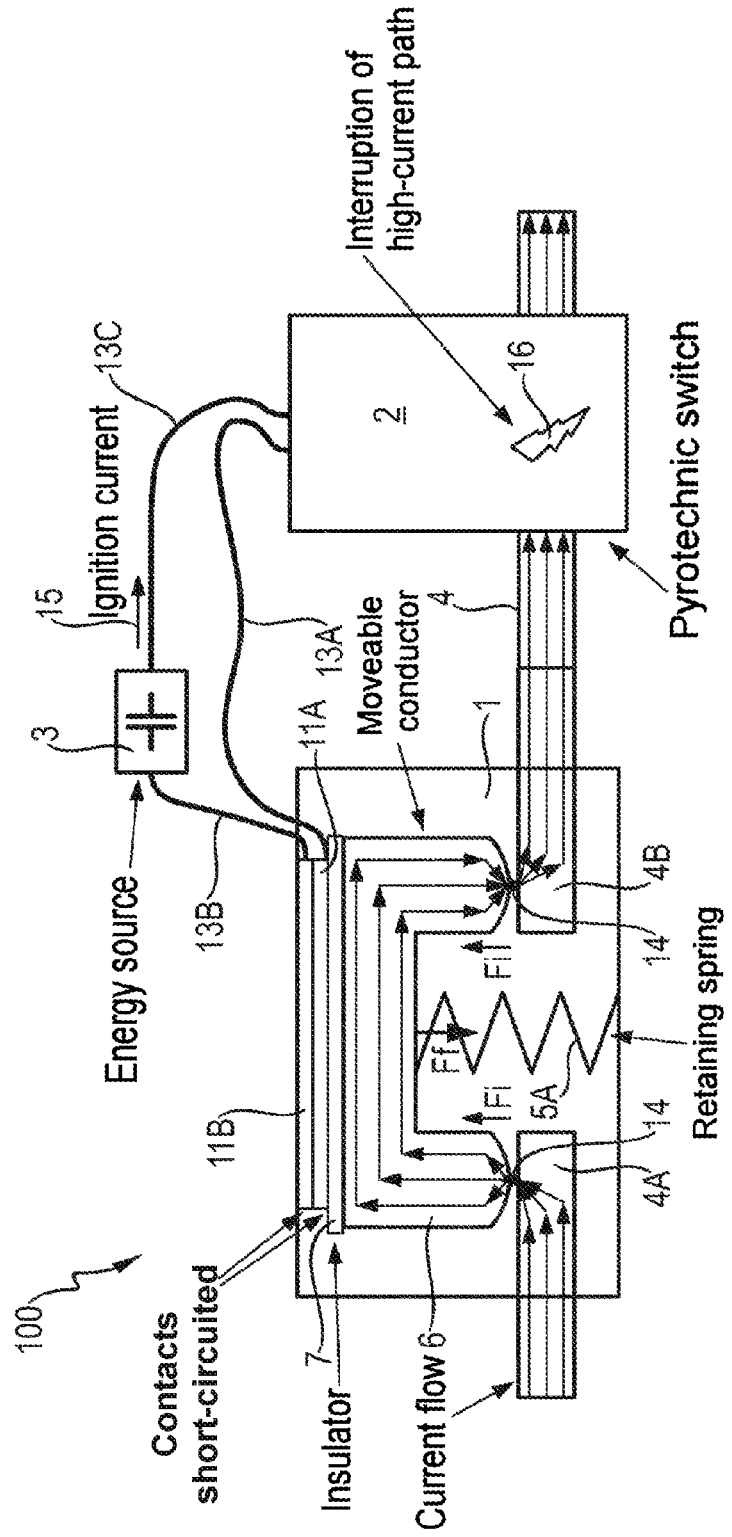
FIG. 3B shows the layout of the DC overcurrent protection apparatus according to the invention shown in FIG. 3A in the event of an overcurrent, according to the schematic arrangement represented in FIG. 1.

FIG. 3B shows the layout of the DC overcurrent protection apparatus 100 according to the invention, as represented in FIG. 3A, in the event of an overcurrent. If an overcurrent flows in the high-current path 4, the bracket 6 is moved against the retaining force of the retaining element (see arrow Fi in FIG. 3B), such that the first control contact 11A engages with the second stationary control contact 11B, as a result of which the first control contact 11A and the second control contact 11B are short-circuited, such that the energy source 3 transmits the requisite ignition current 15 to the pyrotechnic switch-off element 2 for the switch-off of said pyrotechnic switch-off element 2, thereby resulting in an interruption 16 in the high-current path 4.

If the current in the high-current path 4 exceeds a predefined overcurrent value, the high-current contacts on sections 4A, 4B of the high-current path 4 are mutually separated, and the bracket 6 moves against the retaining force of the retaining element 5A, thereby short-circuiting the first and second control contacts 11A, 11B. Upon the separation of the high-current contacts, an arc 14 is generated on each of said high-current contacts. Advantageously, the arc 14 has a high resistance, thereby reducing the flow of current in the high-current path 4. As a result, the interruption/suppression by the pyrotechnic switch-off element 2 of the current/current flow in the high-current path 4 is simplified. The employment of the arc 14 as a resistance in the interests of an easier switch-off by the pyrotechnic switch-off element 2 is particularly advantageous in the event of very high short-circuit currents in the high-current path 4. However, the arc 14, potentially associated with sparking, results in permanent damage to the overcurrent detection unit 1 such that, further to the occurrence of an overcurrent, the overcurrent detection unit 1 cannot be restored to regulation duty without the replacement of the damaged sections 4A, 4B of the high-current path 4 and the bracket 6.

In the DC overcurrent protection apparatus 100 represented in FIGS. 3A and 3B, in place of the retaining element 5A in the form of the retaining spring, a solid retainer can be employed, which fails if the electromagnetic force exceeds the predefined value for an overcurrent.

FIG. 4 shows the layout of the DC overcurrent protection apparatus 100 according to the invention in a further form of embodiment, with a bracket 6 connected in-circuit between control contacts 11C, 11D, in the event of an overcurrent. High-current contacts are constituted by ends of the bracket 6 and sections 4A, 4B of the high-current path 4. The overcurrent detection unit 1 incorporates a retaining element 5B, which is arranged between a wall section of a housing of the overcurrent detection unit 1 and the high-current-conducting bracket 6, which is moveable in relation to said wall section. The bracket 6 is retained by a retaining force of the retaining element 5B (see arrow Ff in FIG. 4) in the direction of the wall section, such that a current flow in the high-current path 4, at a current below the overcurrent, is routed through the bracket 6, and the bracket 6 constitutes an element of the high-current path 4. In this respect, the layout of the overcurrent detection unit 1 represented in FIG. 4 corresponds to the layout of the overcurrent detection unit 1 which is represented in FIGS. 3A, 3B.

In a distinction from the overcurrent detection unit 1 represented in FIGS. 3A, 3B, in one direction of the current flow in the high-current path 4 (see arrows in the high-current path 4, which indicate the flow from the overcurrent detection unit 1 to the pyrotechnic switch-off element 2), the first control contact 11C is connected, up-circuit of the element of the high-current path 4 constituted by the bracket, to section 4A of the high-current path 4. In the direction of the current flow in the high-current path 4, the second control contact 11D is connected, down-circuit of the element of the high-current path 4 constituted by the bracket 6, to section 4B of the high-current path 4.

If the overcurrent flows in the high-current path 4, the bracket 6 moves against the retaining force of the retaining element 5B, away from the element of the high-current path 4, including the sections 4A, 4B, which is not constituted by the bracket (see arrow Fi in FIG. 4), such that an arc 14 is generated respectively on the high-current contact points between the bracket 6 and the sections 4A, 4B of the high-current path 4, the resistance of which results in a voltage drop across the first and second control contacts 11C, 11D. This voltage, and the resistance of the arc 14, generate the ignition current 15, which is transmitted to the pyrotechnic switch-off element 2 for the execution of an interruption 16 in the high-current path 4.

In the DC overcurrent protection apparatus 100 represented in FIG. 4, conversely to the DC overcurrent protection apparatus 100 represented in FIGS. 3A, 3B, there is no energy source 3 which is connected to the second control conductor 13B and the second ignition current transmission line 13C. Instead, the bracket 6 is connected in-circuit between the first and second control contacts 11C, 11D such that, in the event of an overcurrent, arcs 14 generated at the ends of the bracket 6 and sections 4A, 4B of the high-current path 4 have a voltage and a resistance which are sufficient for the generation of the requisite ignition current 15 for the interruption of the high-current path 4, and for the transmission thereof to the pyrotechnic switch-off element 2. Conversely to the DC overcurrent protection apparatus represented in FIGS. 3A, 3B, in the form of embodiment represented in FIG. 4 there are no mutually moveable control contacts, which are short-circuited in the event of an overcurrent in order to permit the delivery by the energy source 3 of the ignition current to the pyrotechnic switch-off element 2. Instead, the first and second control contacts 11C, 11D are directly electrically connected to the pyrotechnic switch-off element 2 in a mutually stationary arrangement on the high-current path 4 by means of third and fourth control conductors 13D, 13E, wherein, in a further alternative form of embodiment, indirect connection is possible, such that the arc 14 or the voltage generated by the arc 14 on the high-current contacts at the ends of the bracket 6 constitutes the energy source for the ignition of the pyrotechnic switch-off element 2.

In normal duty, at currents below the overcurrent, the high-current contacts are closed, and the voltage drop across these high-current contacts is small, and is not sufficient for the ignition of the pyrotechnic switch-off element 2. If, however, in the event of an overcurrent, an arc 14 is generated on at least one end of the bracket 6, a large voltage drop occurs across said bracket 6, as the arc has a high resistance. This voltage is sufficient to ignite the pyrotechnic switch-off element 2, and to trip the interruption 16 of the high-current path.

FIG. 5 shows the layout of a further form of embodiment of the DC overcurrent protection apparatus 100 according to the invention, with a bracket 6 connected in-circuit between first and second control contacts 11E, 11F and, below the overcurrent, a reversibly-isolating overcurrent detection unit 1, in the event of an overcurrent. The overcurrent detection unit 1 incorporates a retaining element 5C, which is arranged between a wall section of a housing of the overcurrent detection unit 1 and a high-current-conducting bracket 6, which is moveable in relation to said wall section. The bracket is retained by a retaining force of the retaining element 5C in the direction of the wall section, and a permanent magnet 18 is attached to the bracket 6 and is carried in a winding 22 such that, if no control voltage from a voltage source 20 is present on the winding 22, a flow of current in the high-current path 4 through the bracket 6 is prevented, and the bracket 6 does not constitute an element of the high-current path 4. If the control voltage from the voltage source 20 is present on the winding 22, and a current which is smaller than the overcurrent flows in the high-current path 4, the bracket 6 moves against the retaining force of the retaining element 5C, such that the flow of current in the high-current path 4 is routed through the bracket 6, and the bracket 6 constitutes an element of the high-current path 4.

High-current contacts are constituted by ends of the bracket 6 and sections 4A, 4B of the high-current path 4. In accordance with the overcurrent detection unit 1 represented in FIG. 4, in one direction of the current flow in the high-current path 4, the first control contact 11E, up-circuit of the element of the high-current path 4 constituted by the bracket, is connected to section 4A of the high-current path 4. In the direction of the current flow in the high-current path 4, the second control contact 11F, down-circuit of the element of the high-current path 4 constituted by the bracket 6, is connected to section 4B of the high-current path 4. In a distinction from the DC overcurrent protection apparatus represented in FIG. 4, in the apparatus according to the invention represented in FIG. 5, the first and second control contacts 11E, 11F are not incorporated in the overcurrent detection unit 1, but are connected outside the overcurrent detection unit 1 to the sections 4A, 4B of the high-current path 4.

The first control contact 11E is connected via the third control conductor 13D to the pyrotechnic switch-off element 2. Between the second control contact 11F and the pyrotechnic switch-off element 2, via a fifth control conductor 13F and a sixth control conductor 13G, a contactor 21 is connected which, in turn, is connected to the voltage source 20. Energy for the voltage source 20 and/or the overcurrent detection unit 1 can be tapped, for example, from an on-board network at a voltage of 12V or 48V in a vehicle, specifically an electric, hybrid or fuel cell vehicle. If no control voltage from the voltage source 20 is present on the winding 22 and on the contactor 21, and the bracket 6 does not constitute an element of the high-current path 4, the contactor 21 ensures that a voltage dropped across the first and second control contacts 11E, 11F, also described as the no-load voltage, does not result in the transmission of an ignition current 15 to the pyrotechnic switch-off element 2.

If an overcurrent flows in the high-current path 4, the bracket 6, notwithstanding the control voltage from the voltage source 20 which is present on the winding 22 and on the contactor 21, moves away from that element of the high-current path which is not constituted by the bracket, in the direction of the retaining force of the retaining element 5C, such that, on the high-current contact points between the ends of the bracket 6 and the sections 4A, 4B of the element of the high-current path 4 which is not constituted by the bracket 6, an arc 14 is generated in each case, having a resistance, which results in a voltage drop across the first and second control contacts 11E, 11F. In response to the voltage and the resistance of the arcs 14, the ignition current 15 is transmitted to the pyrotechnic switch-off element 2, thereby resulting in the interruption of the high-current path 4 by the pyrotechnic switch-off element 2.

In the form of embodiment represented in FIG. 5, the bracket 6, the sections 4A, 4B of the high-current path 4, the retaining element 5C, the permanent magnet 18 and the winding 22 of the overcurrent detection unit 1 constitute a high-current contactor. In the absence of a control voltage from the voltage source 20, the high-current contactor is open, such that a current flow in the high-current path 4 is interrupted. This state can occur in a parked vehicle with the ignition switched off. In the open state of the high-current contactor, said high-current contactor shows a high resistance, and it must be ensured accordingly that a voltage across this resistance or present on the high-current contactor does not result in the ignition of the pyrotechnic switch-off element 2. To this end, the contactor 21, which is required to be able to switch a lower current than the high-current contactor, is arranged in the ignition circuit which comprises the third, fifth and sixth control conductors 13D, 13F, 13G. Advantageously, the contactor 21 is supplied with a control voltage from the same voltage source 20 as the high-current contactor. In this arrangement, an ignition current only flows in the ignition circuit if, firstly, the control voltage is present on the high-current contactor, and the high-current contactor is therefore genuinely in a closed state, such that current can flow in the high-current path 4, and secondly the current flowing through the high-current contactor in the high-current path 4 is sufficiently high to separate the high-current contacts at the ends of the bracket 6, such that an arc 14 is generated, resulting in a voltage which delivers the requisite ignition current to the pyrotechnic switch-off element 2 for the interruption of the high-current path 4.

The form of embodiment of the DC overcurrent protection apparatus 100 according to the invention represented in FIG. 5 can thus effect both the controlled interruption of the high-current path 4 by the high-current contactor of the overcurrent detection unit 1, at currents below the overcurrent, and the interruption of the high-current path 4 in the event of an overcurrent, by means of the ignition of the pyrotechnic switch-off element 2.

All the forms of embodiment described permit the integration of the DC overcurrent protection apparatus according to the invention in a housing or in a component. All the forms of embodiment of the DC overcurrent protection apparatus according to the invention moreover employ an electromagnetic force for the ignition/tripping/switch-off of the pyrotechnic switch-off element 2.

The present invention provides the following advantages over the switch-off of the pyrotechnic switch-off element using a switch-off apparatus based upon a current measurement: the DC overcurrent protection apparatus according to the invention is not sensitive to disturbances, specifically to electromagnetic disturbances which can corrupt a current measurement, but which do not have sufficient energy to generate an electromagnetic force, the magnitude and duration of which are sufficient to execute a movement against a retaining element such as a spring. In this manner, any spurious tripping of the pyrotechnic switch-off element in response to such electromagnetic disturbances is prevented. The DC overcurrent protection apparatus according to the invention requires no continuous current for its operation, and is thus associated with no continuous current consumption. Only the spontaneous discharging of any energy source 3 present, according to the forms of embodiment of the invention represented in FIGS. 1, 2, 3A and 3B will require compensation at occasional time intervals. A capacitor, a double-layer capacitor, a battery, a high-voltage battery supplying a high-voltage on-board network which is to be protected, or similar, can be employed as an energy source 3. Where applicable, a charging circuit can be implemented in the DC overcurrent protection apparatus according to the invention which recharges the voltage source 20 periodically, or in the event of a decline to a minimum energy value which is required for the maintenance of the operation of the energy source, in order to offset spontaneous discharging. As the employment of the electromagnetic force for the mutual electrical connection of the control contacts 11, 11A-11F does not involve any electronic components, the failure rate of the apparatus according to the invention is very low. Moreover, the apparatus according to the invention responds to an overcurrent very rapidly, specifically in the forms of embodiment described with reference to FIGS. 4 and 5.

The characteristics of the invention described with reference to the forms of embodiment represented, including, for example, the arrangement of the first control contact 11E outside the overcurrent detection unit 1, as represented in FIG. 5, can also be present in other forms of embodiment of the invention, including, for example, the arrangement of the second control contact 11D within the overcurrent detection unit 1, as represented in FIG. 4, unless indicated otherwise or precluded per se on technical grounds.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A DC overcurrent protection apparatus, comprising:
an ignition current-controlled irreversible high-current switch-off element;
an overcurrent detection unit which is electrically connected in a high-current path in series with the ignition current-controlled irreversible high-current switch-off element; and
control contacts configured to control the ignition current-controlled irreversible high-current switch-off element, wherein the control contacts are arranged such that they are electrically connectable to one another, wherein
the overcurrent detection unit is configured such that, when an overcurrent with a value equal to or greater than a predetermined current value flows in the high-current path, the control contacts, on account of an electromagnetic force generated by the overcurrent, are electrically connected to each other such that an ignition current is transmitted to the ignition current-controlled irreversible high-current switch-off element and the ignition current-controlled irreversible high-current switch-off element is switched by control to a switched-off state,
the overcurrent detection unit incorporates a retaining element arranged between a wall section of the overcurrent detection unit and a permanent magnet which is moveable in relation to said wall section and held in the direction of the wall section by a retaining force of the retaining element, and to which a first control contact is attached, wherein the high-current path is configured as a winding around the permanent magnet, and
the overcurrent detection unit is configured such that, if the overcurrent flows in the high-current path, the permanent magnet moves against the retaining force of the retaining element, such that the first control contact engages with a second stationary control contact, which is arranged opposite said wall section, as a result of which the first control contact is short-circuited with the second control contact and an energy source which is connected to the second control contact transmits the ignition current to the ignition current-controlled irreversible high-current switch-off element.

2. The DC overcurrent protection apparatus as claimed in claim 1, wherein the high-current path incorporates an inductance, which comprises at least one loop.

3. The DC overcurrent protection apparatus as claimed in claim 2, wherein the retaining element is configured as a spring.

4. The DC overcurrent protection apparatus as claimed in claim 1, wherein the retaining element is configured as a spring.

5. The DC overcurrent protection apparatus as claimed in claim 1, wherein the DC overcurrent protection device is integrated in a housing.

6. The DC overcurrent protection apparatus as claimed in claim 1, wherein the DC overcurrent protection apparatus is integrated in a high-voltage on-board network of an electric or hybrid vehicle.

* * * * *